United States Patent [19]

Hinkel

[11] Patent Number: 4,550,756
[45] Date of Patent: Nov. 5, 1985

[54] PNEUMATIC TIRE TREAD

[75] Inventor: Walter W. Hinkel, Massillon, Ohio

[73] Assignee: The Goodyear Tire & Rubber Company, Akron, Ohio

[21] Appl. No.: 571,394

[22] Filed: Jan. 16, 1984

[51] Int. Cl.[4] ............................................. B60C 11/04
[52] U.S. Cl. .................................................. 152/209 R
[58] Field of Search ........................ 152/209 R, 209 D

[56] References Cited

U.S. PATENT DOCUMENTS

| | | | |
|---|---|---|---|
| 2,604,920 | 7/1952 | Kirby | 152/209 R |
| 2,637,362 | 5/1953 | Briscoe et al. | 152/209 D |
| 2,779,378 | 1/1957 | Robertson | 152/209 R |
| 3,847,698 | 11/1974 | Ravenhall | 152/209 R |
| 4,284,115 | 8/1981 | Ohnishi | 152/209 D |

*Primary Examiner*—Michael Ball
*Attorney, Agent, or Firm*—Fay & Sharp

[57] ABSTRACT

A pneumatic tire having a ground-engaging tread portion. The tread portion has at least two circumferentially extending grooves, each groove having a pair of oppositely disposed sidewalls. One groove sidewall having a first portion extending radially outward in a substantially vertical direction from the base of the groove to a first point spaced a distance from the bottom of the groove a distance no greater than about one-half of the groove depth and a second portion extending from the first point radially outward to the tread surface at an inclined angle. The second groove sidewall extending from the base of the groove to the tread surface at an inclined angle. The included angle between the second portion of the first groove sidewall and the second sidewall being at least thirty degrees (30°).

17 Claims, 3 Drawing Figures

PNEUMATIC TIRE TREAD

The present invention is directed to a pneumatic radial tire and is particularly suited for use on a medium radial heavy duty truck tire designed for mixed service use.

Mixed service tires are subjected to extreme road surface conditions. That is, mixed service tires are designed to be used on a variety of different road surfaces e.g., dirt, gravel and paved. Mixed service type tires must be able to have satisfactory traction and wear performance characteristics when used on normal road surfaces, for example, on paved surfaces, yet also have wear and traction requirements of a tire designed to be used for off-the-road, for example on dirt and gravel roads. It is particularly desirable that the tire minimize stone holding in the recesses of the tread when used in the off-the-road condition and have satisfactory wear characteristics when used on normal road surfaces.

Applicant has found a combination of structural features which provides a tire with a ground engaging tread portion having improved stone rejection qualities while also having improved wear characteristics when used on normal road surfaces.

DETAILED DESCRIPTION OF THE INVENTION

Figure 1:
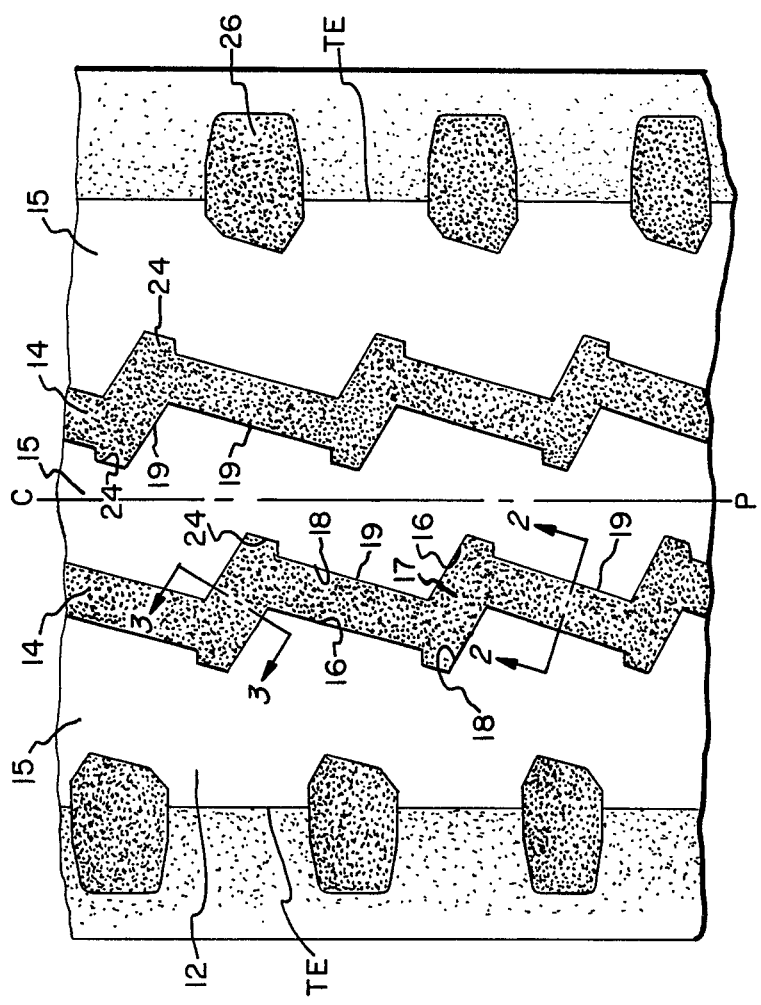
FIG. 1 is a fragmentary elevational view of a portion of a tread of a tire made in accordance with the present invention.

Referring to FIG. 1 there is illustrated a fragmentary view of a tread portion 12 of a tire 10 made in accordance with the present invention. The tire 10 is of the radial type construction. For the purposes of this invention a radial type construction shall mean a tire wherein the cords of the carcass reinforcement lie at an angle from about 75° to 90° with respect to the mid-circumferential centerplane CP of the tire 10.

The tread portion 12 is provided with a pair of circumferentially extending grooves 14 which extend about the entire circumference of the tire which form circumferentially extending ribs 15. In the particular embodiment illustrated, the grooves 14 each have a zig-zag configuration, comprising alternating leg portions 17,19, however, the present invention is not limited to such. For example the grooves may extend about the circumference of the tire in a sinusoidal configuration or a straight configuration. It is preferred that the grooves 14 have a zig-zag or sinusoidal configuration.

Figure 2:
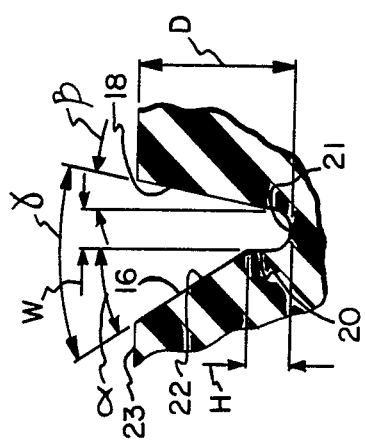
FIG. 2 is a cross-sectional view of a groove made in accordance with the present invention taken along line 2—2 of FIG. 1.
Figure 3:
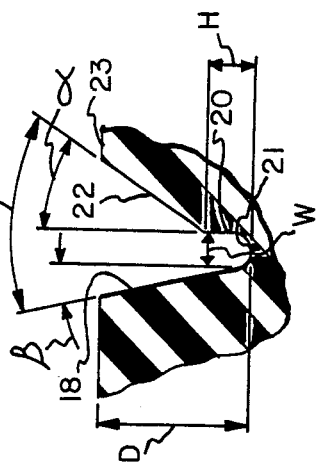
FIG. 3 is a cross-sectional view of a groove made in accordance with the present invention taken along line 3—3 of FIG. 1.

Referring to FIGS. 2 and 3 there is illustrated a cross-sectional view of groove 14 taken along lines 2—2 and 3—3 respectively. For purposes of clarity, only one circumferentially extending groove 14 will be discussed. However, it should be understood that the other circumferential groove 14 has substantially the same configuration.

The groove 14 is provided with a pair of oppositely disposed sidewalls 16,18 respectively. In the particular embodiment illustrated sidewall 16 in leg portion 19 is on the side axially closer to the tread edge TE of the tire whereas in leg portion 17 sidewall 16 is on the side closer to the centerplane CP. This may be varied as desired, for example, sidewall 16 may be on the same axial side in both legs 19,17. Sidewall 16 of legs 19,17 each have a first surface portion 20 which extends in a substantially straight manner from substantially the base 21 of the groove 14 radially outwardly in a substantially perpendicular direction with respect to a plane tangent to the tread surface. The first surface portion 20 has a height H no greater than about 50% of the total tread depth D. Preferably no greater than about 35% of the tread depth D. In the particular embodiment illustrated, the height H is approximately 28% of the distance D. The height H is at least 10% of the depth D and preferably at least 20%. The sidewall 16 is further provided with a second surface portion 22 which extends in a substantially straight manner from the radially outer end of the first portion 20 to the tread surface 23 at an angle $\alpha$. The sidewall 18 of the groove 14 extends from substantially the base 21 of the groove 14 radially outward at an angle of $\beta$, thereby forming an included angle $\gamma$ between sidewall 18 and second portion 22. The angle $\alpha$ of second sidewall surface portion 22 is substantially greater in angle than the angle $\beta$ of sidewall 18 which extends from the base of the groove 14. Angle $\alpha$ is at least 10° greater than angle $\beta$, preferably angle $\alpha$ is greater than angle $\beta$ by a ratio of at least 2 to 1. The provision of substantially unequal angles is believed to exert unequal force on any stone that may be trapped in the groove thereby providing a force to eject the stone from the groove. The angle $\beta$ of sidewall 18 is preferably no greater than 15° and preferably of at least 10°. Angles greater than 15° are generally considered undesirable as it opens up the groove too much. Applicant has found that the included angle $\gamma$ should be at least 35° and preferably of at least 40°. It is understood that angles $\gamma$, $\alpha$ and $\beta$ are substantially constant for each leg portion 17,19 and are measured with respect to a line drawn perpendicular to the tread surface.

In the particular embodiment illustrated, the angle $\alpha$ in leg portion 19 is approximately 33° and the angle $\beta$ leg portion 19 is approximately 11° thereby forming an included angle $\gamma$ of about 44°. The angle $\alpha$ in leg portion 17 is approximately 33°, as in leg portion 17, however, the angle $\beta$ is approximately 16½° thereby forming an inclined angle $\gamma$ of about 49½°.

While the particular embodiment illustrated the leg portions 17,19 are not equal in cross-sectional configuration the present invention is not so limited. For example, the cross-sectional shape may be the same for both legs.

The width W of the groove 16 at the base is preferably of about 0.1 inches (2.54 mm) or greater. In the present invention the base of the groove is rounded so as to provide a radius of about 0.1 inches (2.54 mm).

By providing a high included angle $\gamma$ between second surface portion 22 and sidewall surface portion 18 and an asymmetric configuration wherein the radially outer portion of one sidewall is inclined at an angle substantially greater than the other sidewall surface which extends from the base of the groove that the stone retention in the groove is minimized. Additionally, a cross-sectional groove shape in accordance with the present invention allows the depth D of the tread portion 12 to be increased so as to provide for longer tread wear. In the particular embodiment illustrated the depth D is about 0.715 inches (18.2 mm) as compared to a tread depth of about 0.65" (16.5 mm) for prior art mixed service tires; and increase of about 10% in tread depth. This is accomplished without any substantial reduction of net to gross. For the purposes of this invention the net to gross of the tread portion is the ratio of the area of that portion of the tread which comes in contact with the road surface as compared to the total area available in the footprint of the tire taken when the tire is inflated to design inflation pressure and at rate load. If a tire having two grooves in accordance with the present invention wherein sidewall surface portion 18 is oriented at an angle $\beta$ of 11°, second surface portion 20 of sidewall portion 16 is oriented at an angle $\alpha$ of 33° (to provide an included angle of 44°) and first surface portion 20 has a height H of 0.2 inches (5.1 mm) is compared to a tire having two grooves wherein both sidewalls of each groove extend from the base of the groove at a substantially straight angle of 22° (to provide an included angle of 44°), both tires having the same tread depth of 0.715 inches (18.2 mm), the cross-sectional width of the groove at the tread surface for the groove made in accordance with the present invention would be about 0.656 inches (16.7 mm) whereas the width of the groove of the other tire would be 0.713 inches (18.1 mm). This results in an higher net to gross for the present invention of about 2.3% which is very significant and proves significant improvement in tread wear.

In the particular embodiment illustrated, there is illustrated additional recesses in the tread pattern which do not affect the overall performance of the tire. Referring to FIG. 1 there is illustrated notches 24 at the ends of leg portions 17 of grooves 14. Additionally, in the shoulder regions of the tire there is provided notches 26. Preferably as illustrated the tread pattern is not provided with any continuous water channeling groove which extends across the tread 12 or between the grooves 14.

The present invention is particularly well suited for medium truck tires. For the purposes of this invention a medium heavy duty truck is a tire wherein the nominal rim diameter of the tire ranges from about 18 (457 mm) inches to approximately 27 inches (686 mm).

It is understood that various modifications can be made to the present invention without departing from the scope in the present claims. For example narrow grooves or sipes may be introduced in the tread as desired. For the purposes of this invention the narrow grooves or sipes are grooves which close up when in the footprint of the tire. Further, while the particular embodiment illustrates two circumferentially extending grooves 14, there may be provided as many as desired. This will, of course, depend upon the size of the tire and the performance characteristics desired. Additionally, the sidewall 18 and second surface portion 22 may be approximated by a plurality of short segments or curved surfaces, however, a substantially straight surface is preferred.

I claim:

1. A radial tire having a ground-engaging tread portion, said tread portion comprising at least two circumferentially extending grooves which have a substantially constant width, each groove comprising a plurality of alternating zig-zag segments, each segment having a pair of oppositely disposed sidewalls, one sidewall comprising a first portion extending from substantially the base of the groove radially outwardly in a substantially perpendicular direction with respect to a line tangent to the tread surface, a second portion extending from the radially outer end of said first portion radially outward to the tread surface, and being inclined at a first angle with respect to a line perpendicular to the tread surface, said first portion having a height no greater than approximately 50% of the depth of said groove, said second sidewall extending from substantially the base of the groove radially outwardly to the surface of the tread and being inclined at a second angle with respect to a line perpendicular to the tread surface, and said second sidewall and said second portion of the first sidewall forming an included angle of at least 30°, said first angle of said second portion of said first sidewall being at least 10° greater than said second angle of said second sidewall, and wherein said first and second angles are substantially constant in each segment.

2. A tire according to claim 1 further characterized in that the included angle between said second portion of said first sidewall and said second sidewall being at least 40°.

3. A tire according to claim 1 further characterized by the height of said first portion of said first sidewall being no greater than approximately 35% of the depth of said groove.

4. A tire according to claim 1 further characterized in that the height of said first portion is at least 10% of the depth of said groove.

5. A tire according to claim 1 further characterized whereby the width of said groove adjacent said first portion being at least one-tenth of an inch.

6. A tire according to claim 1 further characterized by said second angle of said second sidewall divided by said first angle of said second portion of said first sidewall being in the ratio of at least two to one.

7. A tire according to claim 1 further characterized by said groove comprises a plurality of alternating zig-zag segments.

8. A tire according to claim 1 further characterized by said tire is a medium heavy duty truck tire designed for mixed service.

9. A pneumatic tire comprising:
   a carcass; and
   a ground-engaging tread portion which includes at least two circumferentially extending grooves which have a substantially constant width, wherein each of said grooves is comprised of a plurality of segments which are disposed in an angled relationship with each other, each segment comprising:
   a first sidewall having a first portion extending from substantially the base of the groove outwardly towards a surface of said tread portion in a direction perpendicular to said tread portion surface, and a second portion extending from a radially outer end of said first portion outwardly to said tread portion surface, said second portion being inclined at a first angle with respect to a line perpendicular to said tread portion surface, said first portion having a height of no greater than approximately 50% of the depth of the groove, and
   a second sidewall extending from substantially the base of the groove outwardly to said tread portion surface and being inclined at a second angle with respect to said line perpendicular to said tread portion surface, said first angle of said second portion of said first sidewall being at least 10° greater than said second angle of said second sidewall wherein said first and second sidewalls alternate sides on each of said plurality of segments, and wherein said first and second angles are substantially constant in each segment.

10. The tire of claim 9 wherein said segments are each of a substantially constant depth.

11. The tire of claim 10 wherein said grooves have a depth of approximately 0.715 (18.16) inches (mm).

12. The tire of claim 10 wherein said grooves each have a width of at least approximately 0.1 (2.54) inch (mm).

13. The tire of claim 9 wherein said first sidewall second portion and said second sidewall form an included angle of at least 40°.

14. The tire of claim 9 wherein said first angle is approximately 33° and said second angle can range from approximately 11° to approximately $16\frac{1}{2}$°.

15. The tire of claim 9 wherein said first and second segments are of different lengths.

16. The tire of claim 9 wherein said first and second sidewalls of each segment are substantially linear.

17. The tire of claim 14 wherein said first angles of two adjacent segments are approximately 33° each, and said second angles of two adjacent segments are approximately 11° and approximately $16\frac{1}{2}$°, respectively.

* * * * *